US012779731B2

(12) United States Patent
Waugh et al.

(10) Patent No.: US 12,779,731 B2
(45) Date of Patent: Nov. 3, 2026

(54) FORMING A PREFORM INTO A SHAPED BODY

(71) Applicant: Rohr, Inc., Chula Vista, CA (US)

(72) Inventors: Katherine Waugh, San Diego, CA (US); Mark A Ramsey, Chula Vista, CA (US); Vijay V Pujar, San Diego, CA (US); Luis A Lopez, Chula Vista, CA (US); Christopher C Koroly, Spring Valley, CA (US); Peter W Aziz, San Diego, CA (US); Kyle Rosenbrock, Pueblo, CO (US)

(73) Assignee: ROHR, INC., Chula Vista, CA (US)

( * ) Notice: Subject to any disclaimer, the term of this patent is extended or adjusted under 35 U.S.C. 154(b) by 546 days.

(21) Appl. No.: 17/890,790

(22) Filed: Aug. 18, 2022

(65) Prior Publication Data

US 2024/0058987 A1 Feb. 22, 2024

(51) Int. Cl.
*B28B 3/00* (2006.01)
*B28B 7/00* (2006.01)
(Continued)

(52) U.S. Cl.
CPC ............ *B28B 3/003* (2013.01); *B28B 7/0097* (2013.01); *B29C 70/40* (2013.01); *B29C 70/44* (2013.01);
(Continued)

(58) Field of Classification Search
CPC ....... Y10T 156/1002; Y10T 428/24628; B29C 43/12; B29C 43/18; B29C 2043/3644; B29C 70/44; B29C 70/46; B29C 33/42; B29C 70/543; B29C 70/56; B29C 70/541; B29C 70/548; B29C 53/02; B29C 70/40; B29C 70/42; B29C 70/50; B29C 70/462; B29C 43/36; B01D 21/20; B29D 99/0003;
(Continued)

(56) References Cited

U.S. PATENT DOCUMENTS 4,973,234 A * 11/1990 Swenson ............... B29C 44/143 425/117
5,128,090 A 7/1992 Fujii et al.
(Continued)

FOREIGN PATENT DOCUMENTS

DE 102004021220 A1 * 12/2004 ............. B29C 41/08
DE 102013008697 X 3/2014
(Continued)

OTHER PUBLICATIONS

Machine English translation of Sekiguchi "JP'752" (JP-2001038752-A) (Year: 2001).*
(Continued)

*Primary Examiner* — Jeffrey M Wollschlager
*Assistant Examiner* — Edgaredmanuel Troche
(74) *Attorney, Agent, or Firm* — SNELL & WILMER L.L.P.

(57) ABSTRACT

A manufacturing method is disclosed herein. The method includes arranging a preform over a surface of an inner mold line; folding the preform over sides of the inner mold line; pressing an end of the preform into a grip strip coupled to a side of the inner mold line; and applying pressure to the preform to force excess material of the preform into a forming bead of the inner mold line.

10 Claims, 8 Drawing Sheets

(51) Int. Cl.
*B29C 70/40* (2006.01)
*B29C 70/44* (2006.01)
*B29C 70/50* (2006.01)
*B29C 70/56* (2006.01)

(52) U.S. Cl.
CPC ............ *B29C 70/446* (2013.01); *B29C 70/50* (2013.01); *B29C 70/56* (2013.01)

(58) Field of Classification Search
CPC ........ B29D 11/00413; B29D 11/00528; B29D 12/00; B29D 11/00721; B29D 22/003; B29D 99/001; B29B 7/02; B29B 7/0002; B29B 7/0014; B32B 1/00; B32B 18/00; B32B 2262/106; B32B 27/14; B32B 27/18; B21D 26/049; B21D 51/26; B28B 1/266; B28B 7/02
USPC .......................... 264/313, 642, 643; 156/457
See application file for complete search history.

(56) References Cited

U.S. PATENT DOCUMENTS

| | | | | |
|---|---|---|---|---|
| 6,723,272 | B2 | 4/2004 | Montague et al. | |
| 9,399,325 | B2 | 7/2016 | Barlag et al. | |
| 9,694,547 | B2 | 7/2017 | Marco et al. | |
| 9,731,457 | B2 | 8/2017 | Kline | |
| 10,150,233 | B2 | 12/2018 | Kline et al. | |
| 2008/0283177 | A1* | 11/2008 | Glain | B29C 70/44 52/127.3 |
| 2008/0286403 | A1* | 11/2008 | Fisch | B29C 45/43 425/549 |
| 2015/0328843 | A1* | 11/2015 | Karb | B29B 11/16 425/389 |
| 2021/0231097 | A1* | 7/2021 | De L.M. Arias | B29C 33/306 |
| 2022/0055320 | A1* | 2/2022 | Smith | F03D 13/10 |

FOREIGN PATENT DOCUMENTS

| | | | | | |
|---|---|---|---|---|---|
| DE | 202015102443 | | | 7/2016 | |
| JP | 10296864 | A | * | 11/1998 | |
| JP | H10296864 | A | * | 11/1998 | |
| JP | 2001038752 | A | * | 2/2001 | B29C 70/44 |
| WO | WO-2012042261 | A1 | * | 4/2012 | B29C 69/00 |
| WO | 2017205064 | | | 11/2017 | |

OTHER PUBLICATIONS

Machine English translation of Tokunaga (JP-10296864-A) (Year: 1998).*
Machine English translation of Sekiguchi “JP'752” (JP-2001038752-A); of record (Year: 2001).*
Machine English translation of Tokunaga (JP-10296864-A); of record (Year: 1998).*
Machine English translation of DE-102004021220-A1 (Year: 2004).*
Machine English translation of JP-H10296864-A (Year: 1998).*
European Patent Office, European Search Report dated Jan. 23, 2024 in Application No. 23188782.9.

* cited by examiner

FORMING A PREFORM INTO A SHAPED BODY

FIELD

The present disclosure relates generally to forming a preform into a shaped body.

BACKGROUND

Shaped composite bodies are utilized in aerospace applications. Various systems and methods are known in the art for forming a preform into a shaped body.

SUMMARY

According to various embodiments of the present disclosure, a manufacturing method is provided. The method includes arranging a preform over a surface of an inner mold line; folding the preform over sides of the inner mold line; pressing an end of the preform into a grip strip coupled to a side of the inner mold line; and applying pressure to the preform to force excess material of the preform into a forming bead of the inner mold line.

In various embodiments, the pressure is a negative pressure applied via a vacuum-bagging mechanism. In various embodiments, the pressure is a positive pressure applied via at least one of an autoclave mechanism, a flexible caul plates and pressurized bladders mechanism, or an actuated platen press mechanism. In various embodiments, the forming bead traverses the inner mold line in at least one of a longitudinal direction or a lateral direction. In various embodiments, at least one of a depth or a width of the forming bead at a location is proportionate to a linear length of the preform at the location. In various embodiments, the forming bead has consistent depth and width. In various embodiments, the forming bead has inconsistent depth or width. In various embodiments, the forming bead has a partial profile geometry selected from a group consisting of a partial concave geometry, a partial circular geometry, a partial tapered geometry, or a partial square geometry. In various embodiments, the forming bead is modifiable using an insert that modifies at least one of a length or a profile geometry of the forming bead. In various embodiments, the end of the preform is held onto the grip strip via a clamping mechanism and wherein the clamping mechanism is at least one of tape or a self-supporting clamp.

Also disclosed herein is a system for forming a preform into a shaped body. The system includes: an inner mold line; a grip strip coupled to a side of the inner mold line and configured to receive an end of the preform; and a pressure mechanism configured to apply pressure to the preform to force excess material of the preform into a forming bead of the inner mold line.

In various embodiments, the pressure is a negative pressure applied via a vacuum-bagging mechanism. In various embodiments, the pressure is a positive pressure applied via at least one of an autoclave mechanism, a flexible caul plates and pressurized bladders mechanism, or an actuated platen press mechanism. In various embodiments, the forming bead traverses the inner mold line in at least one of a longitudinal direction or a lateral direction. In various embodiments, at least one of a depth or a width of the forming bead at a location is proportionate to a linear length of the preform at the location. In various embodiments, the forming bead has consistent depth and width. In various embodiments, the forming bead has inconsistent depth or width. In various embodiments, the forming bead has a partial profile geometry selected from a group consisting of a partial concave geometry, a partial circular geometry, a partial tapered geometry, or a partial square geometry. In various embodiments, the forming bead is modifiable using an insert that modifies at least one of a length or a profile geometry of the forming bead. In various embodiments, the end of the preform is held onto the grip strip via a clamping mechanism and wherein the clamping mechanism is at least one of tape or a self-supporting clamp.

The present disclosure may include any one or more of the individual features disclosed above and/or below alone or in any combination thereof.

The foregoing features and elements may be combined in various combinations without exclusivity, unless expressly indicated herein otherwise. These features and elements as well as the operation of the disclosed embodiments will become more apparent in light of the following description and accompanying drawings.

DETAILED DESCRIPTION

Figure 1:
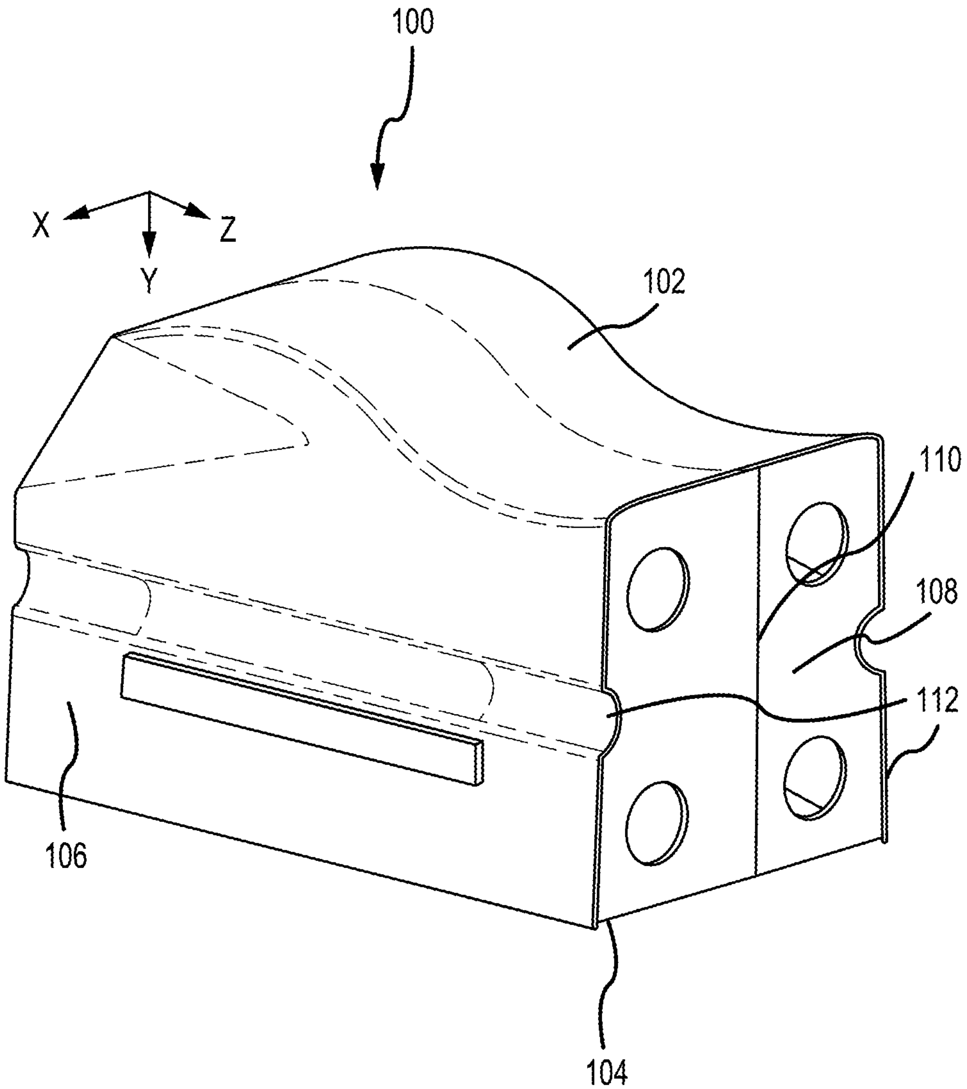
FIG. 1 illustrates an inner-mold line with tensioning and/or forming beads for use in forming a shaped body from in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

Disclosed herein are systems and methods for forming a preform into a shaped body. The systems and methods relate to complex geometry carbon preforms for C-C composites with curvatures along multiple planes. To properly form a shaped body, appropriate tension must be applied to the preform, such that the preform may be stretched around various corners and radii with little to no wrinkling or fiber kinking—important to achieve target mechanical properties and reproducibility. In various embodiments, the systems and methods disclosed herein, in various embodiments, utilize a male inner mold line (IML) tool with tensioning/forming beads to stretch-form the preform. The male IML, tool is designed as a net shape or near net shape (NNS) representation of the final part geometry. The side walls of the preform may be formed around the tool surface until the side walls relatively follow the NNS IML. Ends of the preform are then interfaced with grip strips affixed to the side walls of the IML. In various embodiments, the preform may then be compressed by vacuum-bagging mechanism (i.e., negative pressure) or using vacuum-bagging mechanism and autoclave mechanism (i.e., positive pressure). In various embodiments, the positive pressure on the preforms may be alternatively applied using flexible caul plates and pressurized bladders mechanism or using an actuated platen press mechanism, among others, to apply uniform pressure and compaction. In various embodiments, applying negative pressure draws or forces excess material into the one or more forming beads. In that regard, a vacuum-bagging mechanism is placed around all or a portion of the IML and a negative pressure is applied, where the air pressure is lowered, which draws or forces the excess material into the one or more forming beads. In various embodiments, applying positive pressure presses or forces the excess material into the forming beads. In that regard, mechanisms, such as an autoclave mechanism, a flexible caul plates and pressurized bladders mechanism, or an actuated platen press mechanism, among others, are applied to an exterior of the preform formed over the IML, and the mechanism are actuated such that the preform is pressed or forced into the one or more forming beads. Utilizing the uniform pressure, excess material of the preform is drawn or pressed into the one or more forming bead on the IML, which proportionally tensions and forms the material.

The disclosed systems and methods for forming a preform into a shaped body is an improvement over the current matched-die tooling for shape-forming, in various embodiments, by reducing or eliminating undesired wrinkling and kinking during part forming. The disclosed improvements to tooling, in various embodiments, and forming addresses the wrinkling and uneven compression issues seen in the match-die tooling approach. The tensioning mechanisms provide for controlled tensioning and stretching to produce a fiber preform conforming to the complex shape and avoiding fiber wrinkling and kinking.

Referring now to FIG. 1, in accordance with various embodiments, an inner-mold line with tensioning and/or forming beads for use in forming a shaped body from a preform is illustrated. Inner-mold line (IML) 100 comprises a top section 102, a bottom section 104, side sections 106, a plurality of lateral stiffeners 108, and plurality of longitudinal IML stiffeners 110. In various embodiments, the side sections 106 may be laterally divided by the forming beads 112. In various embodiments, the forming beads 112 have a partial profile geometry. In various embodiments, the side sections 106 may be substantially vertical. In various embodiments, the side sections 106 may be substantially parallel to the y-axis. In various embodiments, the side sections 106 may be substantially perpendicular to the x-axis. In various embodiments, plurality of lateral stiffeners 108 are provided throughout the inner surface of the IML 100 between the opposing side sections 106 to strengthen the IML 100. In various embodiments, plurality of longitudinal IML stiffeners 110 are provided throughout the inner surface of the IML 100 between the top section 102 and the bottom section 104 to strengthen the IML 100.

Figure 2:
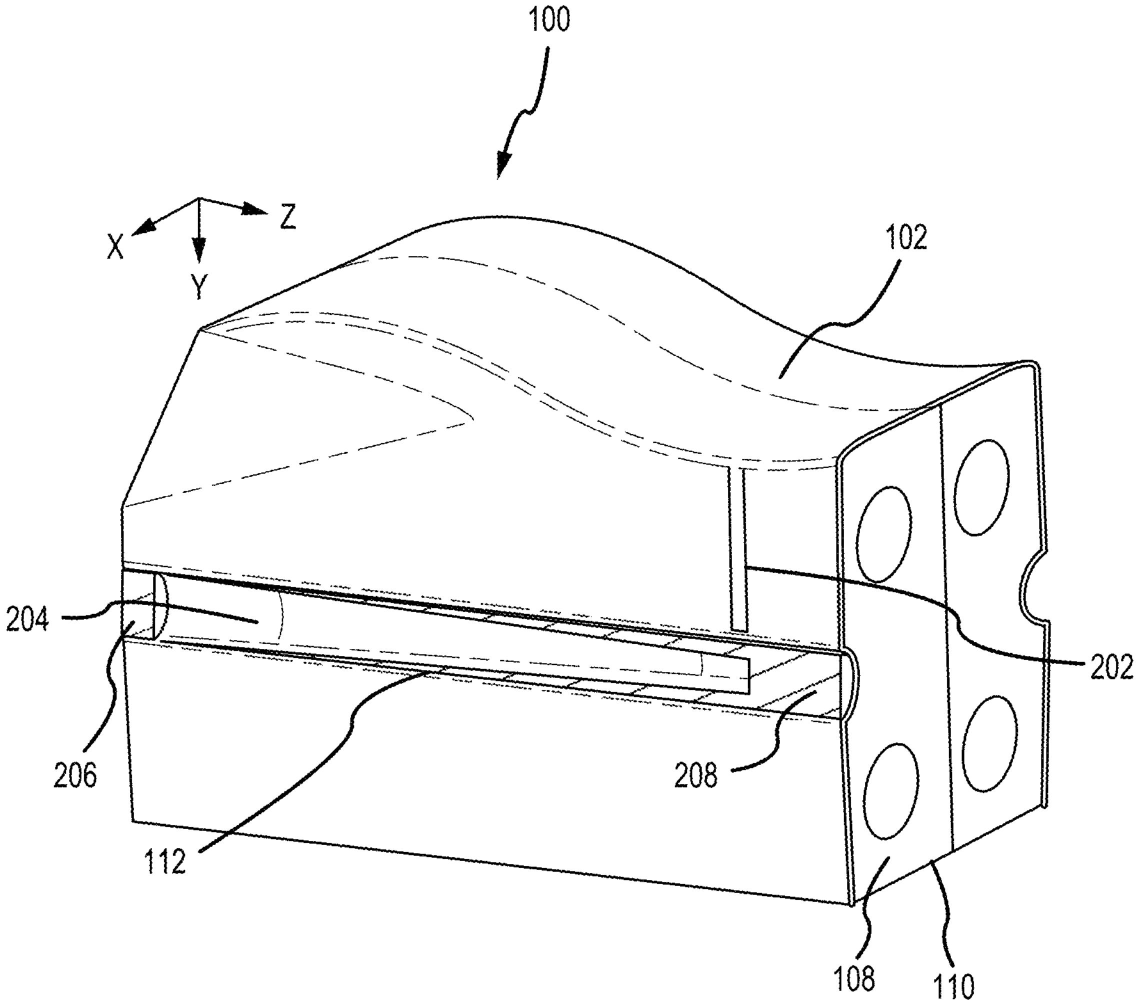
FIG. 2 illustrates various implementations of forming beads in accordance with various embodiments.

Turning now to FIG. 2, in accordance with various embodiments, various implementations of forming beads are illustrated. In various embodiments, the forming beads 112 are configured on the side sections, such as side sections 106 of FIG. 1. In various embodiments, the forming beads 112 may also be configured on any surface of the IML 100, such as on the top section 102, along the plurality of lateral stiffeners 108, along the plurality of longitudinal IML, stiffeners 110, among others. In various embodiments, the forming beads 112 may also be configured to traverse the IML 100 in different directions. In that regard, in addition to traversing the IML 100 in the lateral direction as depicted in FIG. 1, the forming beads 112 may also traverse the IML 100 in a longitudinal direction as illustrated by forming bead 202. In various embodiments, the forming beads may or may not traverse the entire length of the IML 100 as illustrated by forming bead 204. In that regard, a depth and/or a width of the forming bead 204 at a location on the IML 100 may be proportionate to a linear length of the preform at the location. In various embodiments, the forming beads may have a consistent width and/or a consistent depth, which may depend on differential tensioning. In various embodiments, the forming beads may have an inconsistent width and/or an inconsistent depth, which may depend on differential tensioning. In various embodiments, the term inconsistent may refer to an amount that varies is within 20% of, within 10% of, or within 5% of a stated amount or value. In various embodiments, the forming beads, such as forming beads 112, 202, or 204, may have a partial profile geometry, such as a partial concave geometry, a partial circular geometry, a partial tapered geometry, or a partial square geometry, among others. In various embodiments, the forming beads 112, 202, or 204 may be machined into the IML 100. In various embodiments, the forming beads, such as forming beads 112, may be modifiable, by using inserts 206 and/or 208, to modify the length and/or geometry of an existing forming bead, such as the forming beads 112.

Figure 3:
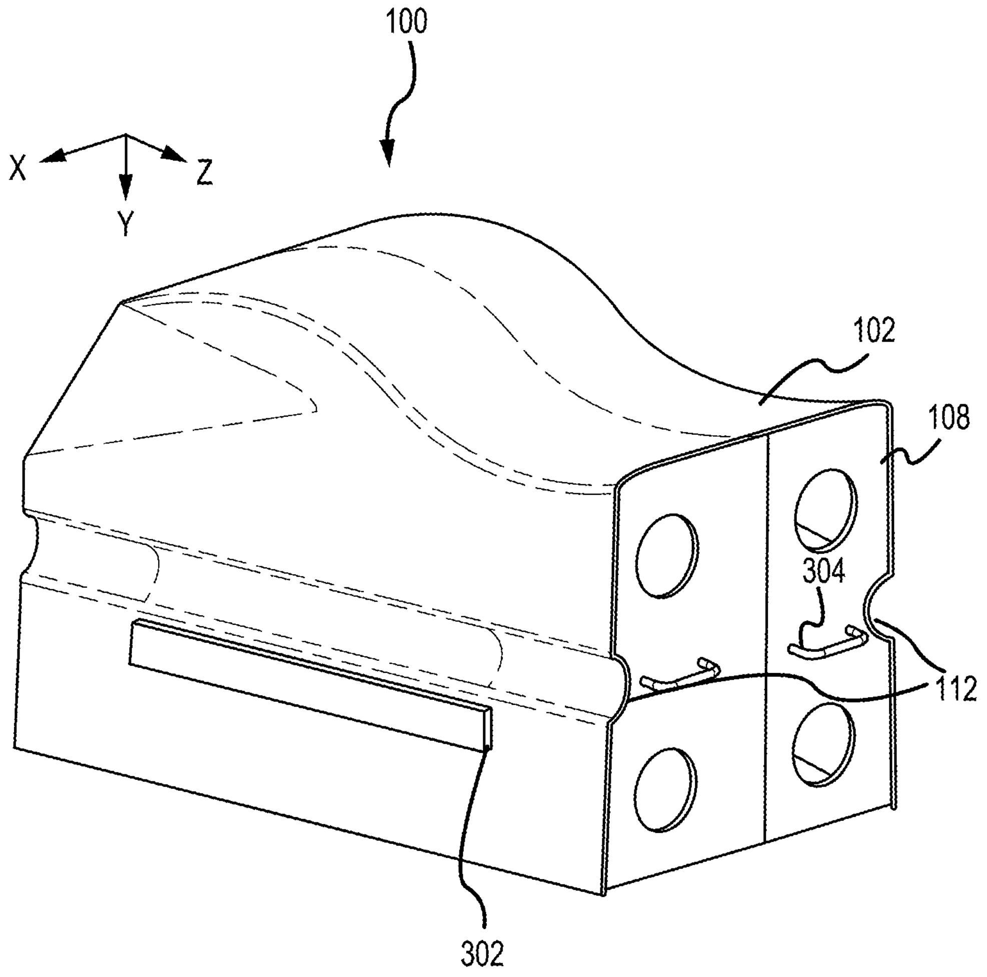
FIG. 3 illustrates added elements to an inner-mold line with tensioning and/or forming beads for use in forming a shaped body from a preform in accordance with various embodiments.

Turning now to FIG. 3, in accordance with various embodiments, added elements to an inner-mold line with tensioning and/or forming beads for use in forming a shaped body from a preform is illustrated. In various embodiments, grip strips 302 may be coupled to the IML 100. In various embodiments, the grip strips 302 may be coupled to the IML 100 parallel to and below the forming beads 112 in a negative y-direction. In various embodiments, the grip strips 302 are positioned such that the grip strips are parallel to and outside the forming beads 112 on an outer surface of the IML 100 so that, when tensioning is applied to the preform, the excess preform material is drawn or pressed into the one or more forming beads 112 of the IML 100. In various embodiments, handles 304 are configured on the plurality of lateral stiffeners 108 lifting the IML 100, such as through hand-lifting or strap lifting, among others.

Figure 4:
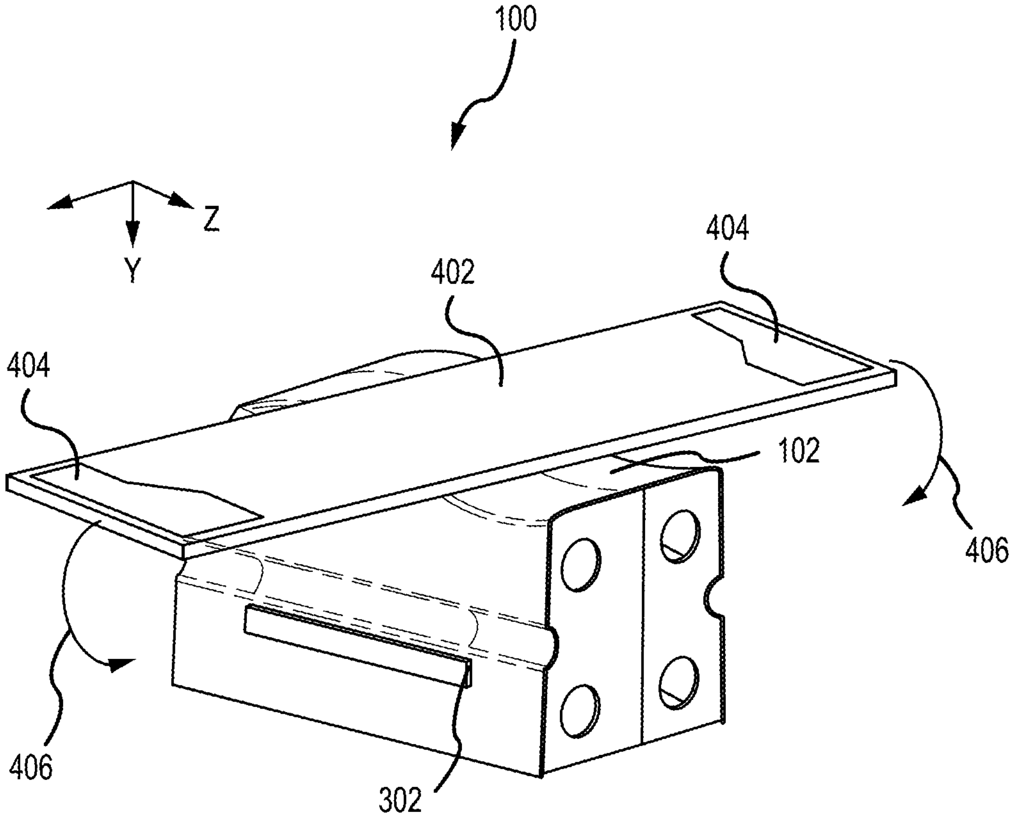
FIG. 4 illustrates initial forming of a preform over an inner-mold line in accordance with various embodiments.

Turning to FIG. 4, in accordance with various embodiments, initial forming of a preform over an inner-mold line is illustrated. In various embodiments, a preform 402 is laid over the top section 102 of the IML 100 of FIG. 1. In various embodiments, the preform 402 may be manufactured from a carbon fiber, polyacrylonitrile (PAN) fiber, or oxidized PAN fiber (OPF), among others, with nylon fiber or polyester fiber stitching in various embodiments and the inclusion of veil materials (carbon, OPF, glass, thermoplastic, etc.) in various embodiments. In various embodiments, the preform 402 is configured in rectangular shape, square shape, or polygon shape, among others. In various embodiments, the preform 402 is then folded over the top section 102, as indicated by arrows 406, pressing a preform grip area 404 at the end of the preform 402 in contact the grip strips 302 of FIG. 3. In various embodiments, the grip strips 302 provide gripping mechanisms to grip the preform, such as pins angled downward, sharp teeth, or hooks, among others.

Figure 5:
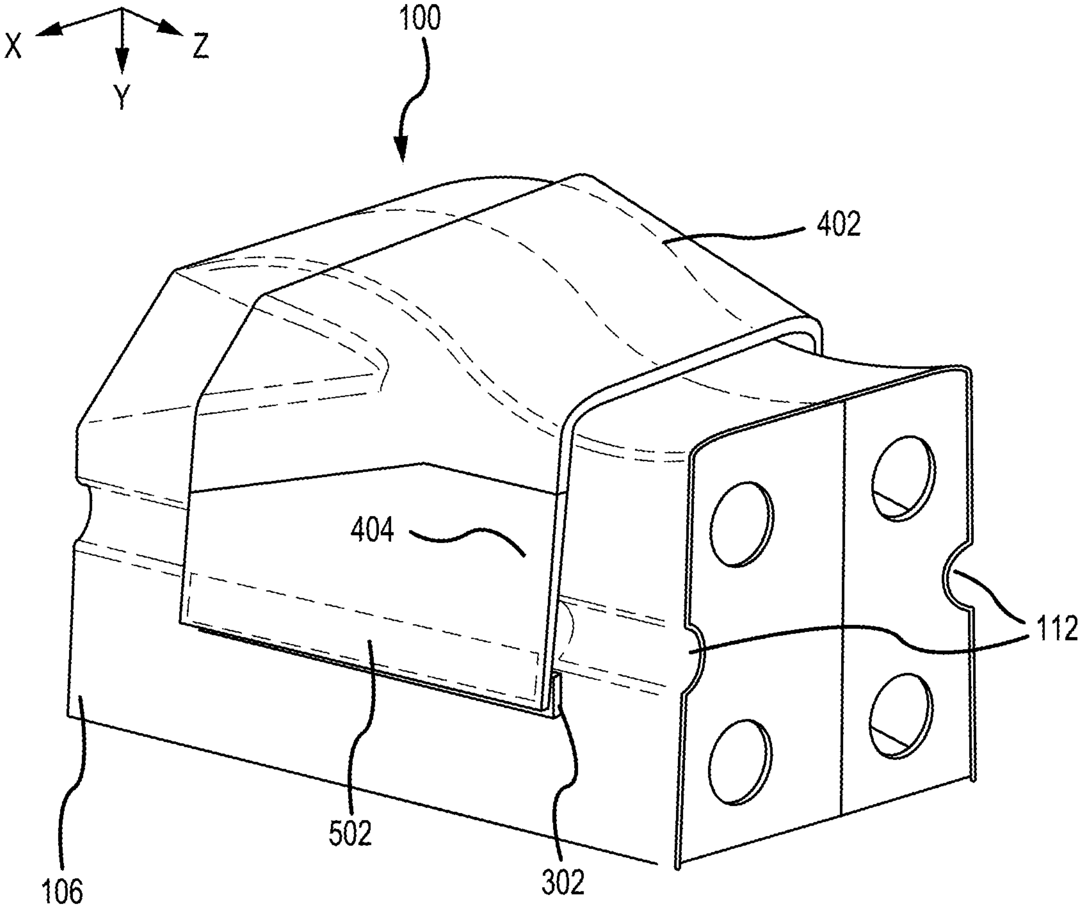
FIG. 5 illustrates a clamping mechanism is illustrated to secure the preform in place in accordance with various embodiments.

Turning now to FIG. 5, in accordance with various embodiments, a clamping mechanism is illustrated to secure the preform in place is illustrated. In various embodiments, to ensure that the preform 402 of FIG. 4 will not slip when pressure is applied, a clamping force provided to a clamping area 502 of the preform grip area 404 to hold the preform 402 in place on the grip strips 302 before positive or negative pressure is applied. In various embodiments, providing such a clamping force ensures that the preform 402 will not slip on the grip strips 302 when positive or negative pressure is applied. In various embodiments, the clamping force may be provided via taping the preform 402 to the side section 106 of the IML 100 or utilizing clamping mechanisms that screw into side section 106 of the IML 100, among others.

Figure 6:
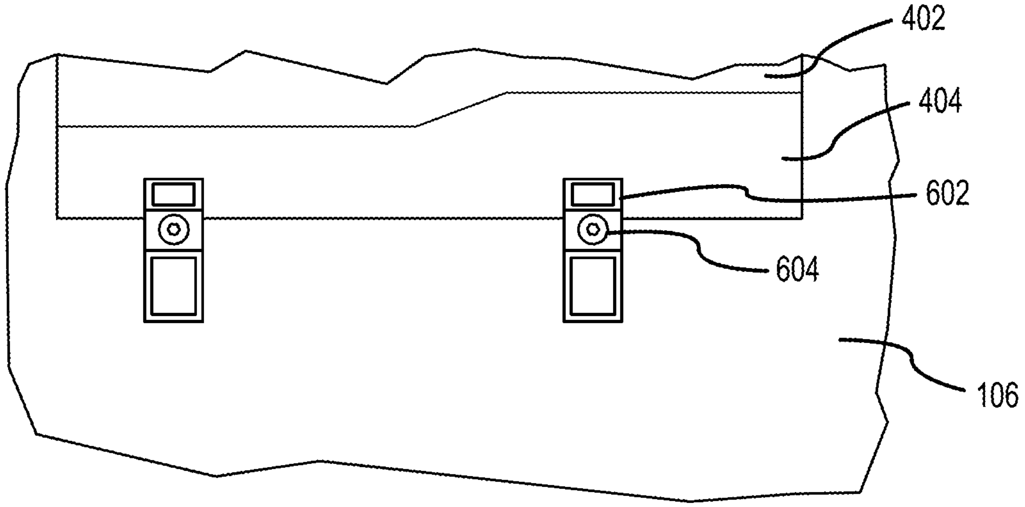
FIG. 6 illustrates a clamping mechanism to provide a clamping force in accordance with various embodiments.

Turing now to FIG. 6, in accordance with various embodiments, a clamping mechanism to provide a clamping force is illustrated. In various embodiments, clamping mechanism 600 comprises self-supporting clamps 602 may be attached to a side section 106 of the IML 100. In various embodiments, the self-supporting clamps 602 may be coupled to the side section 106 via screws 604. In various embodiments, self-supporting clamps 602 clamps onto the preform grip area 404 of the preform 402 of FIG. 4. In various embodiments, self-supporting clamps 602 may be used in conjunction with grip strips 302 of FIG. 3. In that regard, the self-supporting clamps 602 provide a clamping force to hold the preform 402 to the grip strips 302.

Figure 7:
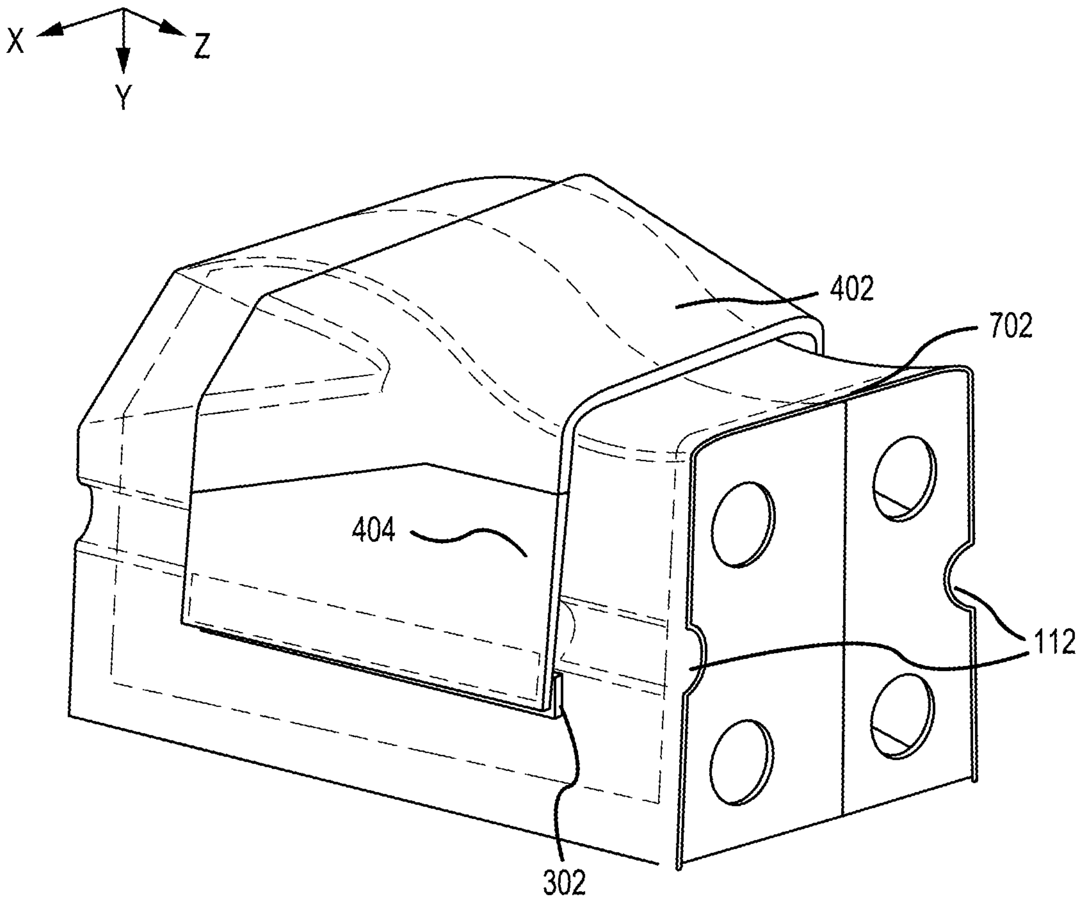
FIG. 7 illustrates forming of a preform over an inner-mold line in accordance with various embodiments.

Turning to FIG. 7, in accordance with various embodiments, forming of a preform over an inner-mold line is illustrated. In various embodiments, as the preform 402 is folded over the top section 102 of the IML 100 of FIG. 1 and the preform grip area 404 at the end of the preform 402 is in contact with the grip strips 302 of FIG. 3, excess material of the preform 402 may be present. As described hereafter, the excess material will be drawn or pressed into the forming beads 112 of FIG. 1 as either negative pressure provided by vacuum-bagging mechanism is applied and/or positive pressure provided by using an autoclave mechanism, flexible caul plates and pressurized bladders mechanism, or an actuated platen press mechanism, among others, is applied. In various embodiments, the preform 402 is of a size that is smaller than a pressure area 702 that is present on the IML 100. In other words, the IML 100 is of sufficient size to provide a pressure area 702 that is larger than a size of the preform 402. In various embodiments, the preform 402 is pressed onto the grip strips 302 and may be held onto the grip strips 302 with tape or self-supporting clamps, among others. In various embodiments, the preform 402 may then be placed under pressure either by a vacuum-bagging mechanism, among others, (i.e., negative pressure) and/or using an autoclave mechanism, flexible caul plates or pressurized bladders mechanism, or an actuated platen press mechanism, among others, to apply uniform pressure and compaction (i.e., positive pressure). In various embodiments, as pressure is applied, excess preform material of the preform 402 will be proportionally pressed or pulled into the forming beads 112 in accordance with differential arc lengths along the length of the preform 402. In various embodiments, tensioning via the forming beads 112 will allow the preform 402 to stretch evenly over the corners and radii of the IML 100, minimizing potential wrinkling or uneven compression.

Figure 8:
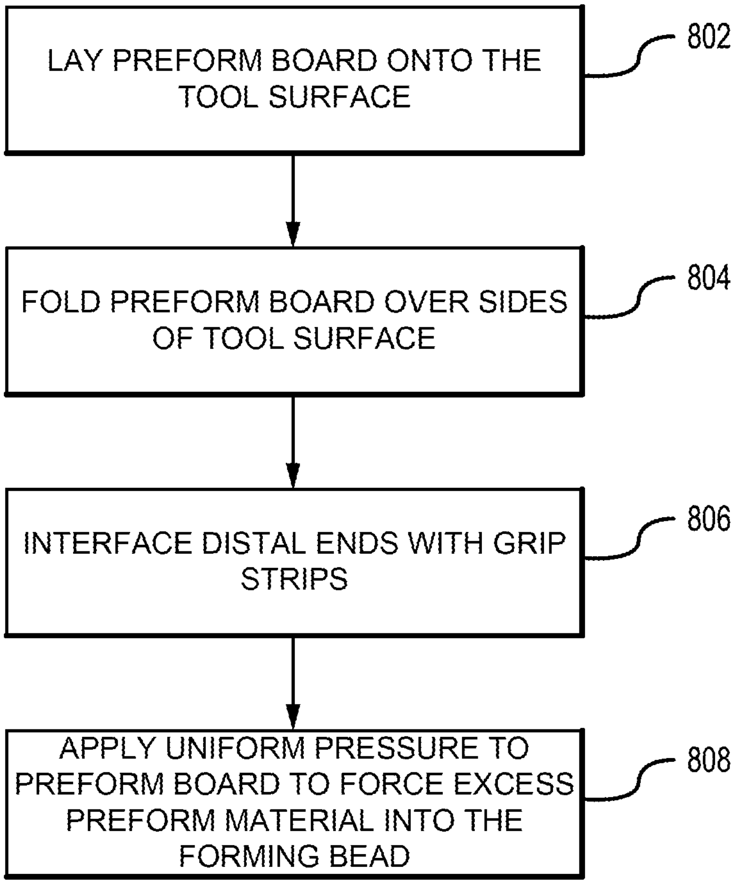
FIG. 8 illustrates a method for forming a preform into a shaped body in accordance with various embodiments.

Referring now to FIG. 8, in accordance with various embodiments, a method for forming a preform into a shaped body is illustrated. For ease of description, the method 800 is described with reference to FIGS. 1 thru 7. In step 802, a preform, such as preform 402 of FIG. 4, is laid onto a top section 102 of an IML 100 of FIG. 1. At block 804, the preform is folded over the sides of the IML. At block 806, a preform grip area, such as preform grip area 404 of FIG. 4, is pressed into contact with grip strips on the IML, such as the grip strips 302 of FIG. 3. At block 808, uniform pressure is applied to the preform proportionally pressing or pulling excess preform material of the preform into forming beads, such as forming beads 112 of FIG. 1, in accordance with differential arc lengths along the length of the preform thereby allowing the preform to stretch evenly over the corners and radii of the IML, minimizing potential wrinkling or uneven compression.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms “substantially,” “about,” or “approximately” as used herein represent an amount close to the stated amount that still performs a desired function or achieves a desired result. For example, the term “substantially,” “about,” or “approximately” may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase “means for.” As used herein, the terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A manufacturing method, comprising:

arranging a preform over a surface of an inner mold line, wherein the inner mold line includes at least a top section, a bottom section, and a set of side sections between the top section and the bottom section;

folding the preform over the top section and the side sections of the inner mold line;

pressing an end of the preform into a set of grip strips, each grip strip in the set of grip strips coupled to a respective side section of the set of side sections of the inner mold line, wherein each grip strip is positioned parallel to and below a forming bead formed in each side section of the set of side sections of the inner mold line; and applying pressure to the preform to force excess material of the preform into the forming bead in each side section of the inner mold line, wherein a length of the forming bead is reduced using a first insert configured to reduce the length of the forming bead and wherein a profile geometry of the forming bead is modified using a second insert that is configured to modify the geometry of the forming bead.

2. The manufacturing method of claim 1, wherein the pressure is a negative pressure applied via a vacuum-bagging mechanism.

3. The manufacturing method of claim 1, wherein the pressure is a positive pressure applied via at least one of an autoclave mechanism, a flexible caul plates and pressurized bladders mechanism, or an actuated platen press mechanism.

4. The manufacturing method of claim 1, wherein the forming bead traverses the inner mold line in at least one of a longitudinal direction or a lateral direction.

5. The manufacturing method of claim 1, wherein at least one of a depth or a width of the forming bead at a location is proportionate to a linear length of the preform at the location.

6. The manufacturing method of claim 1, wherein the forming bead has consistent depth and width.

7. The manufacturing method of claim 1, wherein the forming bead has inconsistent depth or width.

8. The manufacturing method of claim 1, wherein the forming bead has a partial profile geometry selected from a group consisting of a partial concave geometry, a partial circular geometry, a partial tapered geometry, or a partial square geometry.

9. The manufacturing method of claim 1, wherein the end of the preform is held onto the grip strip via a clamping mechanism and wherein the clamping mechanism is at least one of tape or a self-supporting clamp.

10. The manufacturing method of claim 1, wherein the set of grip strips provide gripping mechanisms and wherein the gripping mechanisms are at least one of pins angled downward, sharp teeth, or hooks.

* * * * *